United States Patent

[11] 3,621,039

[72] Inventor Helmut Muller
  Lubecker Str. No. 8, Gladbeck, Germany
[21] Appl. No. 883,293
[22] Filed Dec. 8, 1969
[45] Patented Nov. 16, 1971

[54] BENZOPHENONEHEXACARBOXYLIC ACID-4,5,4',5'-DIANHYDRIDE-2,2'-DILACTONE
1 Claim, No Drawings
[52] U.S. Cl. .................................................... 260/343.3,
  260/30.4 A, 260/517
[51] Int. Cl. ...................................................... C07d 5/46
[50] Field of Search ........................................... 260/343.3

[56] References Cited
UNITED STATES PATENTS
3,268,537   8/1966   Gosnell et al. ..................   260/287

Primary Examiner—Alex Mazel
Assistant Examiner—Anne Marie T. Tighe
Attorney—Burgess, Dinklage and Sprung ABSTRACT: Benzophenonehexacarboxylic acid-4,5,4',5'-dianhydride-2,2'-dilactone ($C_{19}HO_4O_{10}$) having the formula:

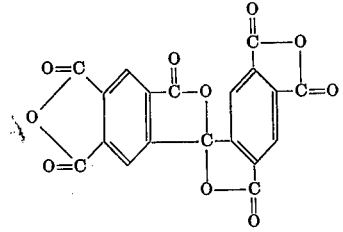

This compound is made in one embodiment by the reaction of benzophenone 2,4,5,2',4',5'-hexacarboxylic acid with acetic anhydride.
Esters thereof with alkanols are useful as plasticizers for polyvinylchloride.

BENZOPHENONEHEXACARBOXYLIC ACID-4,5,4',5'-DIANHYDRIDE-2,2'-DILACTONE

PRIOR ART

In the condensation of pseudocumene with paraformaldehyde in the presence of p-toluylsulfonic acid, bis-[2,4,5-trimethylphenyl]-methane (dipseudocumylmethane) is obtained in a good yield. In the hydrocracking of this product, pseudocumene and durene are produced, which indicates the position of the methyl groups.

If bis-[2,4,5-trimethylphenyl]-methane is oxidized with $HNO_3$, benzophenone-2,4,5,2',4',5'-hexacarboxylic acid is obtained. This compound has also been prepared by M. I. Faberov and collaborators (Z. org. Chem. 4 (1968) I, 163–168) by the nitric acid oxidation of bis-[2,4,5-trimethylphenyl]-ethane. The position of the carboxyl groups can be determined by treatment with molten alkali at 280° C. A mixture of trimellitic and pyromellitic acid is obtained, which is possible only if the carboxyl groups are in a 2,4,5,2',4',5' configuration. Benzophenone-2,4,5,2',4',5'-hexacarboxylic acid can also be obtained by the nitric acid oxidation of 2,4,5,2',4',5'-hexamethylbenzophenone, which is obtained by the air oxidation in the liquid phase of bis-[2,4,5-trimethylphenyl]-methane or by the reaction of pseudocumene with phosgene in the presence of $AlCl_3$.

It is preferable, when using polybasic carboxylic acids for the preparation of their polyesters, polyamides or polyimides, to use the corresponding carboxylic acid anhydrides as the starting products.

THIS INVENTION

Benzophenone-2,4,5,2',4',5'-hexacarboxylic acid ($C_{19}H_{10}O_{13}$, mol. wt. 446.27) is transformed according to this invention to its anhydride by treatment with acetic anhydride. The product, in which 3 moles of water have been expelled for each mole of hexacarboxylic acid has, on the basis of a molecular weight of 392.22 ($C_{19}H_4O_{10}$), a calculated neutralization number of 858 mg. KOH per gram. The anhydride prepared from the hexacarboxylic acid no longer has any free carboxyl groups, as determined by its infrared spectrum.

In the reaction of the anhydride with absolute methanol without the addition of an esterification catalyst, a dimethyl ester of the hexacarboxylic acid is obtained having a molecular weight of 456.3 ($C_{21}H_{12}O_{12}$) and a neutralization number of 492 mg. KOH/g. That is, only 2 of the possible 3 anhydride groups are cleaved by the methanol into a carboxyl group plus a methyl ester group.

It has been found that these two anhydride groups are in positions 4,5 and 4',5', which are equal in their reactivity. The carboxyl groups in the 2,2' positions, however, form a dilactone with the keto group, as is the case with benzophenone-2,2'-dicarboxylic acid.

The formation of a trianhydride from benzophenone-2,4,5,2',4',5'-hexacarboxylic acid might have been expected to yield an eight-member ring, but for structural reasons this is highly improbable. The dilactone of this invention, however, has two five-member rings. The resultant compound is benzophenonehexacarboxylic acid-4,5,4',5'-dianhydride-2,2'-dilactone.

EXAMPLE

Twenty g. of bis-[2,4,5-trimethylphenyl]-methane were heated with 400 g. of 20 percent nitric acid for 5 hours at 170° C. in an autoclave. The oxidation product was concentrated and the hexacarboxylic acid was filtered, washed with water and dried in vacuo at 100° C. 20.4 g. (equivalent to 57.6 mole-percent of benzophenone-2,4,5,2',4',5'-hexacarboxylic acid) were obtained, having a neutralization number of 740 mg. of KOH/g. (theory 755), which after esterification with diazomethene, had a purity of 96.8 percent as determined by a gas fractogram.

Ten g. of the benzophenone-2,4,5,2',4',5'-hexacarboxylic acid were heated for 1 hour with 50 ml. of acetic anhydriede, with refluxing. The hexacarboxylic acid did not go into solution. After cooling to room temperature it was filtered and washed with dried benzene. The benzophenonehexacarboxylic acid-4,5,4',5'-dianhydride-2,2'-dilactone was then dried in vacuo at 100° C.

Yield: 8.0 g. = 91 mole percent
Neutralization number 857 mg. KOH/g. (theory 858)
Melting point: greater than 400° C.
$C_{19}$ Five grams of benzophenonehexacarboxylic acid 4,5,4',5'-dianhydride-2,2'-dilactone were boiled with 30 ml. of absolute methanol for 30 minutes with the exclusion of moisture and then concentrated by evaporation until dry. The remaining concentrate had a neutralization number of 496 mg. KOH/g. For the diester of the hexacarboxylic acid the calculated neutralization number is 492 mg. KOH/g.

In the determination of the neutralization number the dilactone group is considered directly as an anhydride group, without requiring saponification by boiling with an excess of alkali.

The dilactone of this invention can be used advantageously as a starting material for the preparation of artificial resins, fibers, films and varnish products.

The dilactone has proven to be especially useful as a plasticizer. The desirable effects which the dilactone produces in this case can be seen from the following example.

At the present time the phthalic acid esters of high alcohols are used mainly as plasticizers for PVC. Much better plasticizing properties have in the meantime been achieved by using trimellitic acid instead of phthalic acid. These trimellitates exhibit better characteristics than the phthalates, especially in aging tests. For example, by using trimellitates as plasticizers for plastics in automobile construction, the window fogging effect that is occasioned by evaporable plasticizers which precipitate on the windows can be substantially reduced.

Benzophenonehexacarboxylic acid-4,5,4',5'-dianhydride-2,2'-dilactone plasticizers produce much better results than trimellitates as regards aging and solution loss.

For the preparation of plasticizer, benzophenonehexacarbolyxic acid-4,5,4',5'-dianhydride-2,2'-dilactone was esterified with Alfol 610 (20 percent n-hexanol, 35 percent n-octanol and 45 percent n-decanol). The excess alcohol was driven off with steam and the ester was filtered through bleaching earth.

The following formula was used for the preparation of sheet materials:

100 parts Vinnol H 70 F PVC
50 parts plasticizer
0.3 parts stabilizer
0.2 parts lubricant Specimens measuring 5×5 cm. were cut from the sheet and tested for aging and extraction losses, with the following results:

| | Plasticizer composed of— | | |
|---|---|---|---|
| | Trimellitic acid anhydride and Alfol 610 | Benzophenone-tetracarboxylic acid dianhydride-2,2'-dilactone and Alfol 610 | DIN Test Method |
| Aging loss, 7 days at 90° C., in wt.-percent | 0.28 | 0.13 | 53,371 |
| Extraction loss in water, 4 days at 20° C., in wt.-percent | 0.2 | 0.05 | 53,472 |
| In test benzine (100–140° C.), 20 h. at 20° C., wt.-percent | 27.2 | 24.3 | 53,476 |

This comparison clearly shows that the characteristics of the plasticizer based on benzophenonehexacarboxylic acid-4,5,4',5'2,2'-dilactone are better than the corresponding trimellitates.
I claim:
1. Benzophenonehexacarboxylic acid-4,5,4',5'-dianhydride-2,2'-dilactone, ($C_{19}H_4O_{10}$), having the following structural formula:
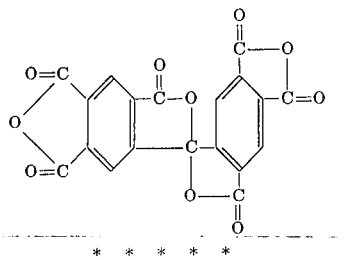
* * * * *

PO-1050
(5/69)

UNITED STATES PATENT OFFICE
CERTIFICATE OF CORRECTION

Patent No. 3621039          Dated November 16, 1971

Inventor(s) Helmut Muller

It is certified that error appears in the above-identified patent and that said Letters Patent are hereby corrected as shown below:

Col. 2, line 23

After "$C_{19}$" insert -- $H_4O_{10}$

C: calc. 58.2%     H: calc. 1.03% found   58.8%     Found 0.89% --

Col. 3, line 3 after "4,5,4',5'" insert -- dianhydride --.

Signed and sealed this 23rd day of May 1972.

(SEAL)
Attest:

EDWARD M. FLETCHER, JR.
Attesting Officer

ROBERT GOTTSCHALK
Commissioner of Patents